US009946935B2

(12) United States Patent
Miyano et al.

(10) Patent No.: US 9,946,935 B2
(45) Date of Patent: Apr. 17, 2018

(54) OBJECT TRACKING DEVICE, OBJECT TRACKING METHOD, AND OBJECT TRACKING PROGRAM

(71) Applicant: NEC Corporation, Tokyo (JP)

(72) Inventors: Hiroyoshi Miyano, Tokyo (JP); Tatsuya Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/905,707

(22) PCT Filed: Jun. 17, 2014

(86) PCT No.: PCT/JP2014/003244
§ 371 (c)(1),
(2) Date: Jan. 15, 2016

(87) PCT Pub. No.: WO2015/008432
PCT Pub. Date: Jan. 22, 2015

(65) Prior Publication Data
US 2016/0162738 A1  Jun. 9, 2016

(30) Foreign Application Priority Data
Jul. 17, 2013  (JP) .................... 2013-148390

(51) Int. Cl.
*G06K 9/00* (2006.01)
*G06K 9/62* (2006.01)
(Continued)

(52) U.S. Cl.
CPC ....... *G06K 9/00771* (2013.01); *G06K 9/6223* (2013.01); *G06T 7/277* (2017.01); *G06T 2207/30232* (2013.01)

(58) Field of Classification Search
CPC .................... G06K 9/00; G06T 7/00
(Continued)

(56) References Cited

U.S. PATENT DOCUMENTS 7,583,294 B2 * 9/2009 Ray .................... G06K 9/00228
348/222.1
8,315,430 B2 * 11/2012 Kovtun ............. G06F 17/30793
382/103
9,500,748 B2 * 11/2016 Noda .................... G01S 13/584

FOREIGN PATENT DOCUMENTS

| JP | 2005-165688 | 6/2005 |
| JP | 2012-159958 | 8/2012 |
| JP | 2013-77202 | 4/2013 |

OTHER PUBLICATIONS

N. Dalal et al., "Histograms of Oriented Gradients for Human Detection", pp. 886-893, CVPR 2005.
(Continued)

*Primary Examiner* — Abolfazl Tabatabai
(74) *Attorney, Agent, or Firm* — Finnegan, Henderson, Farabow, Garrett & Dunner, L.L.P.

(57) ABSTRACT

Tracking candidate storage means 81 stores a plurality of candidates for one or more objects to be tracked. Control means 82 controls a likelihood of each of the plurality of candidates. The tracking candidate storage means 81 stores, for each of the plurality of candidates, label information identifying which object the candidate corresponds to, position information indicating a position of the object, and a likelihood. The control means 82 controls the likelihood of a candidate, according to the label information of one or more other candidates around the candidate determined based on the position information of the candidate.

12 Claims, 13 Drawing Sheets

(51) Int. Cl.
 *G06T 7/277* (2017.01)
 *H04N 5/225* (2006.01)
(58) Field of Classification Search
 USPC ............... 382/103, 107, 236; 348/154, 155,
 348/169–172, 352
 See application file for complete search history.

(56) References Cited

OTHER PUBLICATIONS

N. Ikoma, "Multiple moving target tracking in dynamic image by random finite set state space model and sequential Monte Carlo filter", CVIM 2010.
B-N. Vo et al., "The Gaussian Mixture Probability Hypothesis Density Filter", IEEE Transactions Signal Processing, vol. 54, No. 11, pp. 4091-4104, Nov. 2006.
K. Panta et al., "Improved Probability Hypothesis Density (PHD) Filter for Multitarget Tracking", IEEE, pp. 213-218, 2005.
International Search Report and Written Opinion of ISA dated Sep. 22, 2014 in corresponding PCT International Application.

\* cited by examiner

OBJECT TRACKING DEVICE, OBJECT TRACKING METHOD, AND OBJECT TRACKING PROGRAM

CROSS-REFERENCE TO RELATED PATENT APPLICATIONS

This application is a National Stage Entry of International Application No. PCT/JP2014/003244, filed Jun. 17, 2014, which claims priority from Japanese Patent Application No. 2013-148390, filed Jul. 17, 2013. The entire contents of the above-referenced applications are expressly incorporated herein by reference.

TECHNICAL FIELD

The present invention relates to an object tracking device, object tracking method, and object tracking program for tracking objects in a situation where the number of objects to be tracked is unknown beforehand and changes with time.

BACKGROUND ART

Objects are detected using a camera, a radio wave sensor, and the like, and tracked based on the detection results. In the case of tracking a plurality of objects in a state where the number of objects to be tracked is unknown beforehand and changes with time, the objects need to be tracked while taking into account the events such as the appearance of a new object to be tracked and the disappearance of an existing object to be tracked.

Tracking methods in such a case where the number of objects to be tracked changes with time have been proposed. Non Patent Literatures (NPLs) 1 and 2 describe a tracking technique called the probability hypothesis density (PHD) filter that models the changes of the number of objects to be tracked. This is a technique of tracking objects while holding many candidates for the objects based on particle filtering and the like. This method has a feature that each candidate has position information, a likelihood, and a label value that represents the ID of the object. In the case of particle filtering, the candidates are called particles.

For example, consider tracking objects on a two-dimensional map. Suppose there are four candidates $X_1$, $X_2$, $X_3$, and $X_4$, and the candidate $X_1$ has a position of (30, 40), a likelihood of 0.7, and a label value of 1, the candidate $X_2$ has a position of (20, 50), a likelihood of 1.0, and a label value of 2, the candidate $X_3$ has a position of (35, 45), a likelihood of 0.3, and a label value of 1, and the candidate $X_4$ has a position of (50, 70), a likelihood of 0.5, and a label value of 3. For the object 1, there are the candidates $X_1$ and $X_3$ and the sum of likelihoods is calculated at 1. For the object 2, there is the candidate $X_2$ and the likelihood is calculated at 1. For the object 3, there is the candidate $X_4$ and the likelihood is calculated at 0.5.

This reveals that the position of the object ID of 1 is $X_1$ with a proportion of 70% and $X_3$ with a proportion of 30%, and the only candidate corresponding to the object 3 is $X_4$ whose likelihood is 0.5 and so the probability of existence of the object is 50%. The use of the technique described in NPL 1 or 2 thus enables tracking while probabilistically taking into account the changes of the number of objects to be tracked.

The same applies when using a method of tracking many candidates by an extended Kalman filter technique as described in NPL 3 as an example, instead of the process based on particle filtering.

NPL 4 describes an example of human detection techniques.

CITATION LIST

Non Patent Literature

NPL 1: K. Panta, B. Vo, S. Singh, "Improved Probability Hypothesis Density (PHD) Filter for Multitarget Tracking," 2005.

NPL 2: Ikoma, "Multiple moving target tracking in dynamic image by random finite set state space model and sequential Monte Carlo filter," CVIM 2010.

NPL 3: Ba-Ngu Vo and Wing-Kin Ma, "The Gaussian Mixture Probability Hypothesis Density Filter," SP, 2006.

NPL 4: Dalai, N., Triggs, B., "Histograms of oriented gradients for human detection," pp. 886-893, CVPR 2005.

SUMMARY OF INVENTION

Technical Problem

The technique described in NPL 1 or 2 updates the likelihood of every candidate each time an object detection result is obtained from a sensor such as a radio wave sensor or a camera. The technique described in NPL 1 or 2, however, does not take into account the labels of neighboring candidates. In other words, the technique described in NPL 1 or 2 fails to take into account the label relationship between the candidates when calculating the likelihoods, and simply performs a process of generating candidates irrespective of their label values and moving the candidates so that more candidates are present near the detection result.

This technique has a problem in that, when objects to be tracked come closer to each other, many candidates are generated near the objects to be tracked, but candidates of various labels are equally located near each object to be tracked and so the labels mix together, making individual objects indistinguishable.

The technique also has a problem in that, in the case where the number of candidates is small, an ID change event in which candidates for an ID which has been tracked in the tracking process are scattered or lost and the ID is replaced with a new ID occurs frequently, which tends to cause fragmented tracking results.

The present invention accordingly has an object of providing an object tracking device, object tracking method, and object tracking program that can properly track each object even in the case where objects to be tracked are near each other in an environment in which the number of objects changes with time.

Solution to Problem

An object tracking device according to the present invention is an object tracking device for tracking one or more objects, the object tracking device including: a tracking candidate storage means which stores a plurality of candidates for the objects to be tracked; and a control means which controls a likelihood of each of the plurality of candidates, wherein the tracking candidate storage means stores, for each of the plurality of candidates, label information identifying which object the candidate corresponds to, position information indicating a position of the object, and a likelihood, and wherein the control means controls the likelihood of a candidate, according to the label information of one or more other candidates around the candidate determined based on the position information of the candidate.

An object tracking method according to the present invention is an object tracking method for tracking one or more objects, the object tracking method including: holding a plurality of candidates for the objects to be tracked, each of the plurality of candidates being associated with label information identifying which object the candidate corresponds to, position information indicating a position of the object, and a likelihood; and controlling the likelihood of a candidate, according to the label information of one or more other candidates around the candidate determined based on the position information of the candidate.

An object tracking program according to the present invention is an object tracking program used in a computer for tracking one or more objects, the computer holding a plurality of candidates for the objects to be tracked, the object tracking program causing the computer to: execute a control process of controlling a likelihood of each of the plurality of candidates, each of the plurality of candidates being associated with label information identifying which object the candidate corresponds to, position information indicating a position of the object, and a likelihood; and in the control process, control the likelihood of a candidate, according to the label information of one or more other candidates around the candidate determined based on the position information of the candidate.

Advantageous Effects of Invention

According to the present invention, each object can be properly tracked even in the case where objects to be tracked are near each other in an environment in which the number of objects changes with time.

DESCRIPTION OF EMBODIMENT

Figure 1:
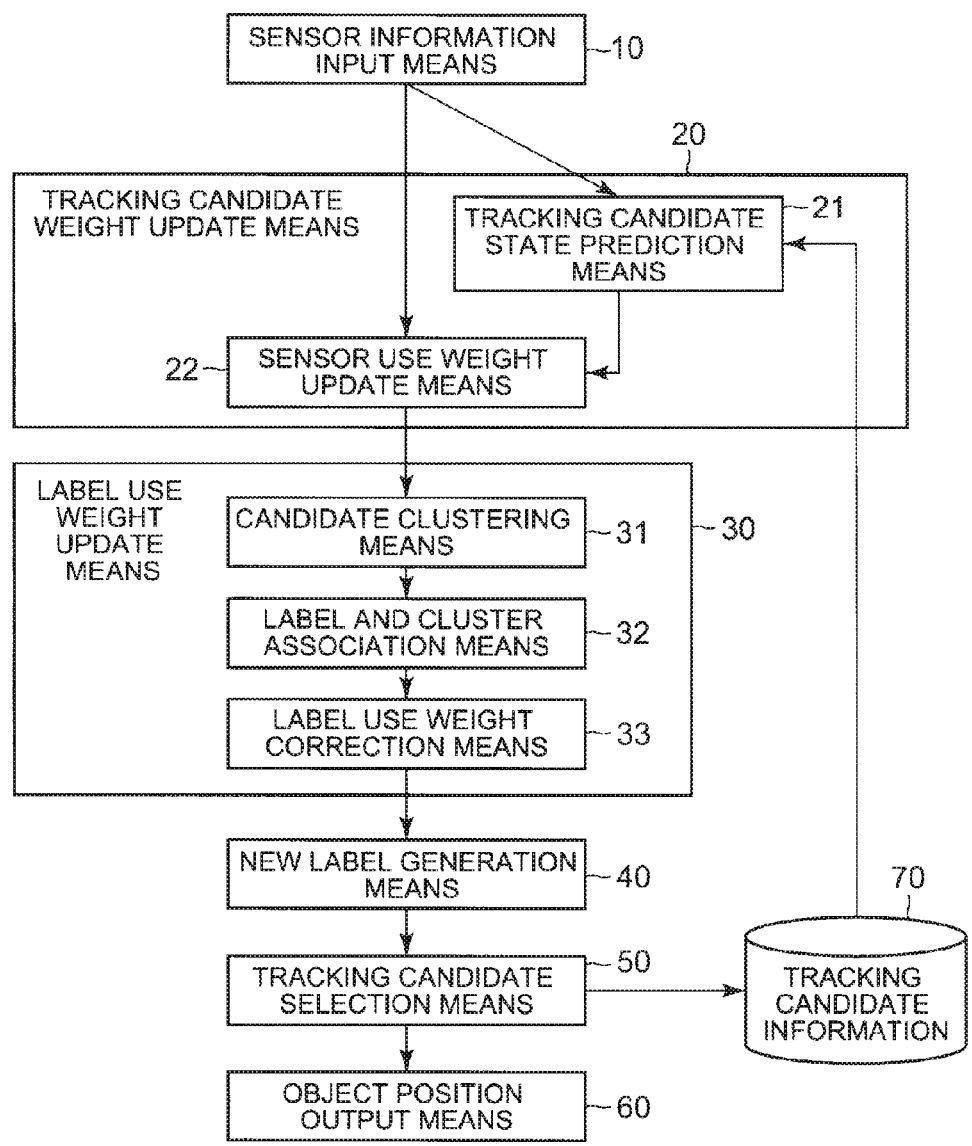
FIG. 1 is a block diagram depicting an exemplary embodiment of an object tracking device according to the present invention.

The following describes an exemplary embodiment of the present invention with reference to drawings. FIG. 1 is a block diagram depicting an exemplary embodiment of an object tracking device according to the present invention.

The object tracking device depicted in FIG. 1 as an example includes sensor information input means 10, tracking candidate weight update means 20, label use weight update means 30, new label generation means 40, tracking candidate selection means 50, object position output means 60, and tracking candidate information storage means 70.

The sensor information input means 10 receives input of an object position observation result by a sensor such as a radio wave sensor or a camera. The tracking candidate weight update means 20 updates the weight of each of the candidates for one or more objects to be tracked, using the input sensor information. The label use weight update means 30 updates the weight of each object candidate, using the label information of the object candidates. The new label generation means 40 determines whether or not a new object is present and, if the new object is present, assigns a label corresponding to the new object to each corresponding object candidate. The tracking candidate selection means 50 selects tracking candidates that continue to be evaluated in subsequent processing. The object position output means 60 outputs the position of one or more objects being tracked eventually. The tracking candidate information storage means 70 stores information of tracking candidates. The operation of each means included in the object tracking device is further described below.

The sensor information input means 10 receives input of the results of observing the positions of objects being tracked, such as vehicles or humans, using a sensor such as a radio wave sensor or a camera. The input information from the sensor is hereafter denoted by $Z_1, Z_2, \ldots, Z_M$ in the case where there are M pieces of input information. An observation result Zi is given as an observed position (x, y) on a map.

The sensor information input means 10 may receive the position of each object being tracked, as two-dimensional coordinates on the map. If the object is floating in the air, the sensor information input means 10 may receive the position as three-dimensional coordinates. In the case where each object being tracked is captured by a camera, the sensor information input means 10 may receive coordinates representing a pixel in video, as the position of the object.

In the case where the size of each object being tracked is observable, too, the sensor information input means 10 may receive the observation result of the size in addition to the observation result of the position. For example, in the case of tracking humans using a camera in an environment in which the number of humans changes with time, the sensor information input means 10 may perform human detection using the human detection technique as described in NPL 4, and obtain the center coordinates of each detected rectangle as an observation result.

Figure 2:
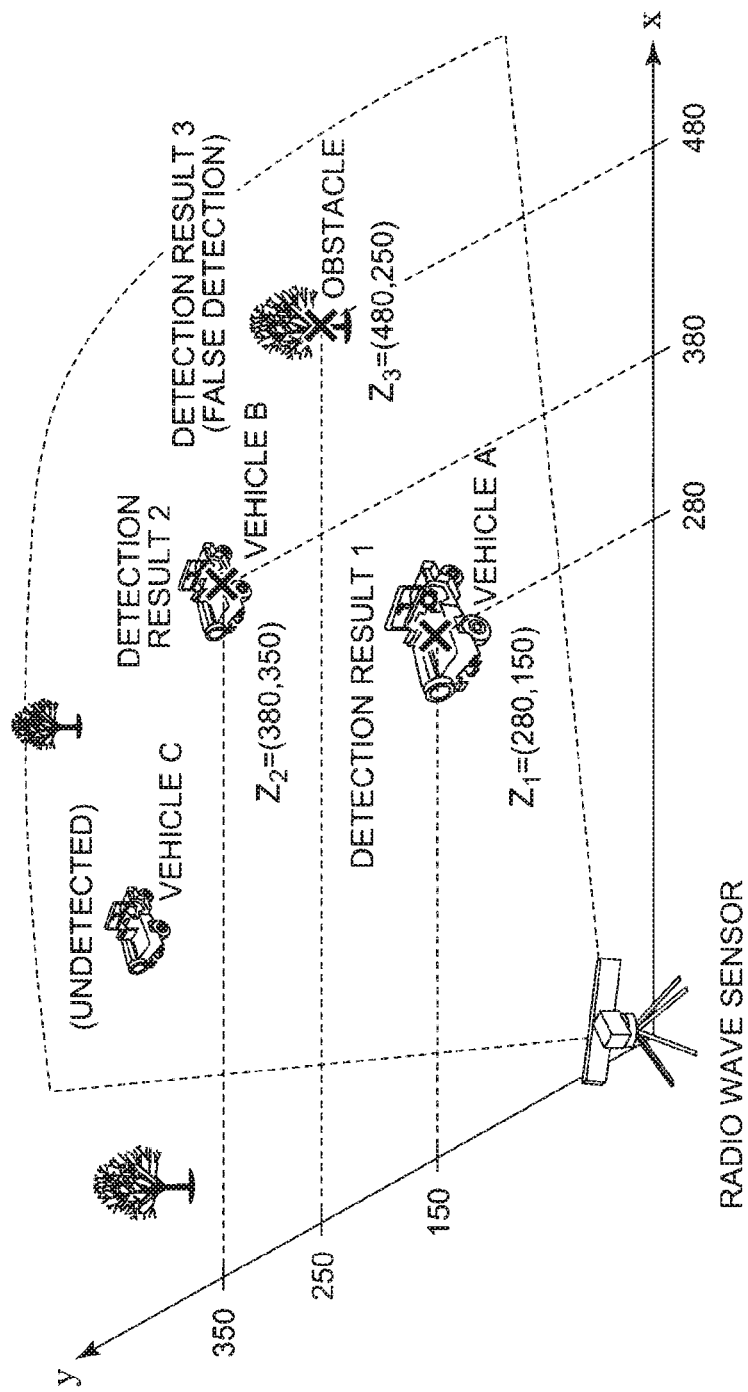
FIG. 2 is an explanatory diagram depicting an example of detecting vehicles using a radio wave sensor.

The following describes the case of tracking vehicles based on vehicle detection results obtained by a radio wave sensor, with reference to FIG. 2. FIG. 2 is an explanatory diagram depicting an example of detecting vehicles using a radio wave sensor. FIG. 2 depicts an example where three vehicles (vehicles A, B, and C) are present in an area observable by a radio wave sensor, and three detection results are obtained by the radio wave sensor. Detection results 1 and 2 are the results of successfully detecting the vehicles A and B, respectively. Meanwhile, false detection in a location where no vehicle is present, like a detection result 3, or a state of undetection where a vehicle such as the vehicle C is unable to be detected could occur. These three detection results ($Z_1$=(280, 150), $Z_2$=(380, 350), $Z_3$=(480, 250)) are an example of observation results.

Figure 3:
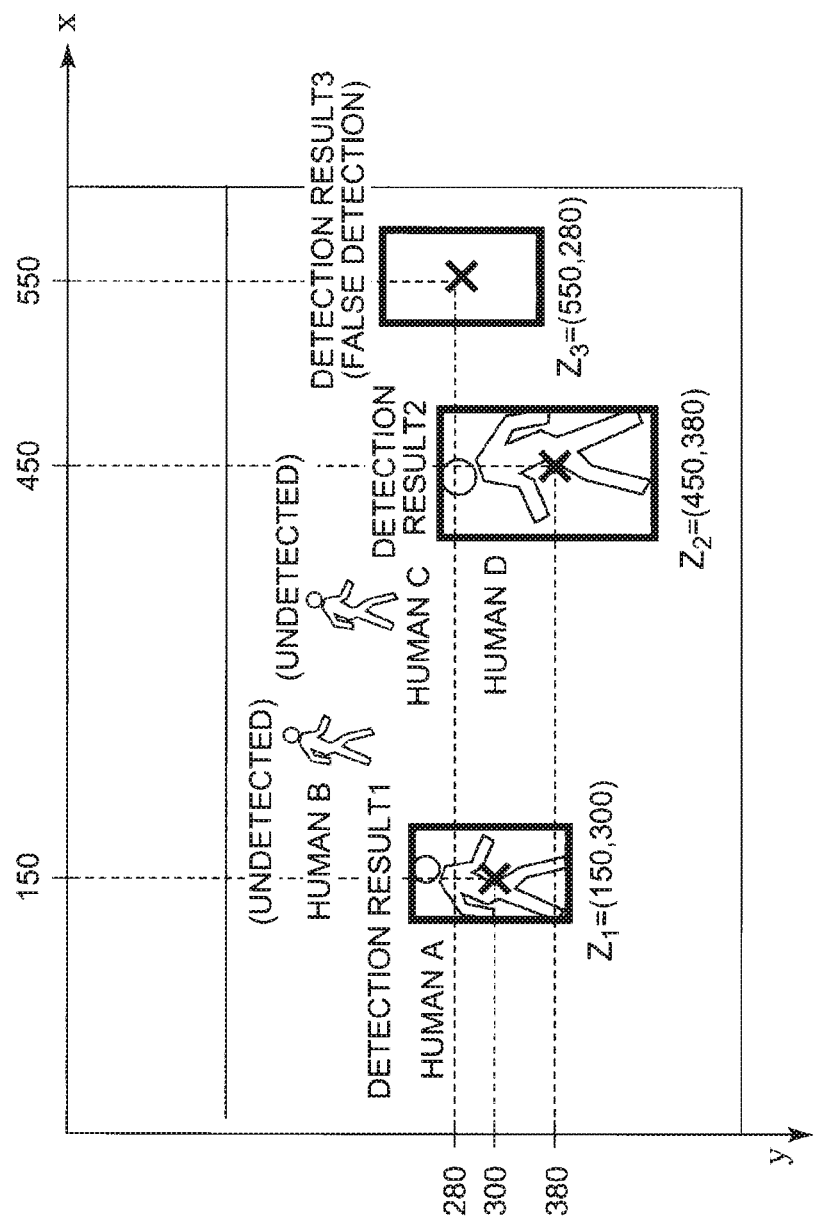
FIG. 3 is an explanatory diagram depicting an example of detecting humans using a camera.

As another example, the following describes the case of tracking humans in video obtained by a camera, with reference to FIG. 3. FIG. 3 is an explanatory diagram depicting an example of detecting humans using a camera. FIG. 3 depicts an example where four humans (humans A, B, C, and D) are present in video of a camera, and three detection results are obtained by performing the above-mentioned human detection. Detection results 1 and 2 are the results of successfully detecting the humans A and D, respectively. Meanwhile, false detection in a location where no human is present, like a detection result 3, or a state of undetection where a human such as the human B or C cannot be detected, could occur. The respective center coordinates ($Z_1$=(150, 300), $Z_2$=(450, 380), $Z_3$=(550, 280)) of these three detection results are an example of observation results.

The tracking candidate information storage means 70 stores a plurality of candidates for objects to be tracked. These candidates are hereafter also referred to as tracking candidates. In detail, the tracking candidate information storage means 70 stores, for each candidate, an identifier (hereafter referred to as a label or label information) for identifying which object corresponds to the candidate, information (hereafter referred to as position information) indicating the position of the object as the candidate, and the likelihood of the candidate for the object. The likelihood is hereafter also referred to as a weight. The label, position information, and likelihood of each candidate are also collectively referred to as tracking candidate information. Since an object to be tracked can be estimated using tracking candidate information, tracking candidate information can be regarded as information indicating the state of each object to be tracked.

The tracking candidate weight update means 20 updates the state of each object to be tracked stored in the tracking candidate information storage means 70, using sensor information obtained by the sensor information input means 10. The tracking candidate weight update means 20 includes tracking candidate state prediction means 21 and sensor use weight update means 22.

Figure 4:
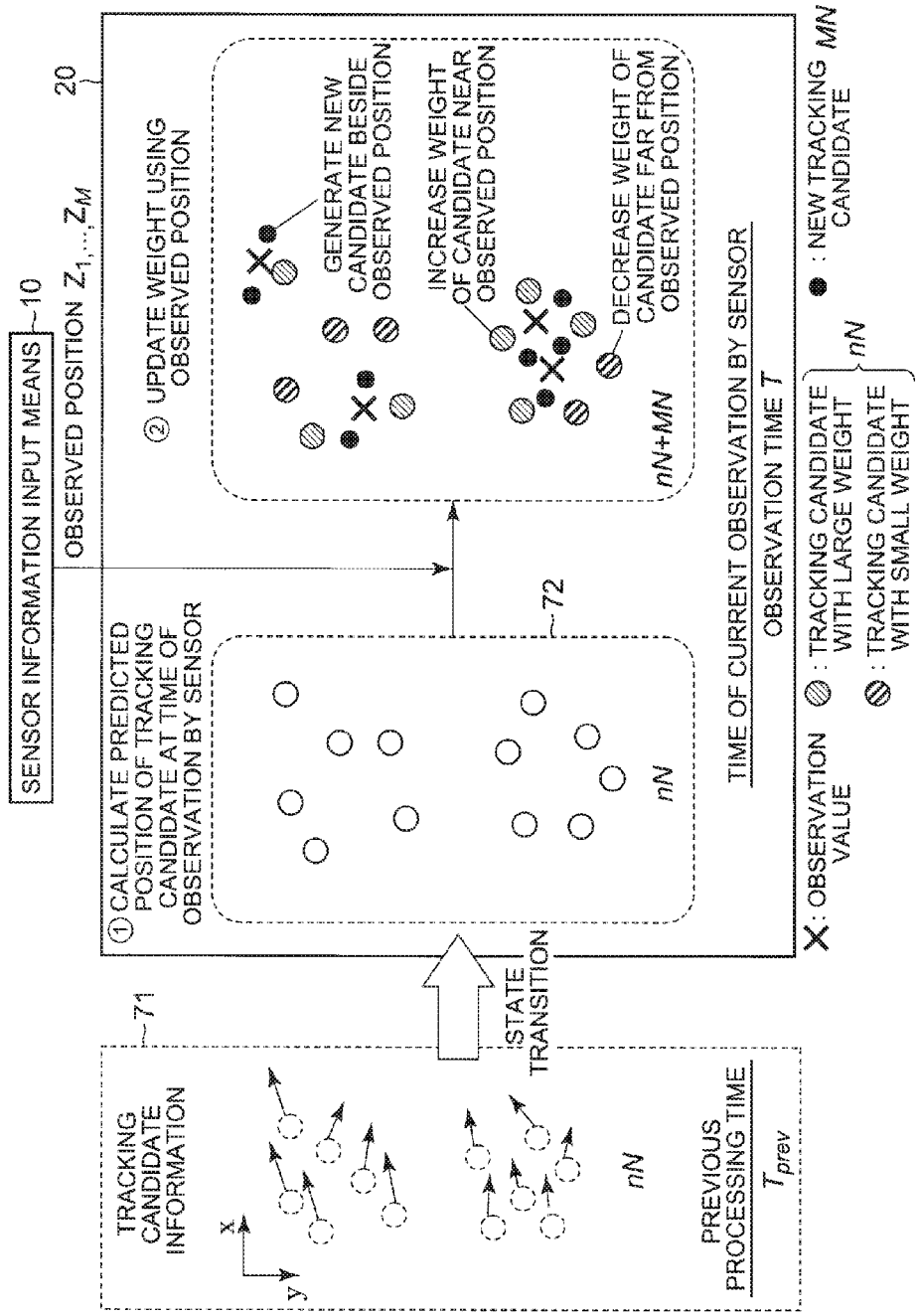
FIG. 4 is an explanatory diagram depicting an example of the process of updating the weights of candidates.

FIG. 4 is an explanatory diagram depicting an example of the process of updating the weights of candidates. As depicted in FIG. 4, the tracking candidate state prediction means 21 predicts, for each piece of tracking candidate information 71 stored in the tracking candidate information storage means 70, the position at the time when sensor information is received (see tracking candidate information 72 in FIG. 4). The sensor use weight update means 22 updates the weight indicating the likelihood of each candidate, using the information of the positions observed by the sensor.

The number of candidates for objects to be tracked is adjusted to a larger number in the case where the number of objects to be tracked is expected to be larger, and to a smaller number in the case where the number of objects to be tracked is expected to be smaller, as described in NPLs 1 and 2. The expected number of objects to be tracked is typically calculated using the sum of the weights of all candidates. In the following description, let n be the expected number of objects to be tracked, and N be the number of candidates per expected. Then, the number of candidates for objects to be tracked provided from the tracking candidate information storage means 70 is nN.

In the case where there are nN candidates for objects to be tracked, the tracking candidates are denoted by $X_1$, $X_2$, ..., $X_{nN}$. A tracking candidate $X_j$ has a position ($x_j$, $y_j$) and a speed ($u_j$, $v_j$), a weight $w_j$ indicating the likelihood of the candidate for the object to be tracked, and a label $l_j$ indicating which object to be tracked the candidate corresponds to. The tracking candidate weight update means 20 employs, for example, the PHD filter-based tracking technique as described in NPL 1.

In detail, the tracking candidate state prediction means 21 acquires the time T of the observation of the sensor information, from the sensor information input means 10. The tracking candidate information storage means 70 stores the already obtained tracking candidates. The tracking candidate state prediction means 21 predicts the current state of each tracking candidate at the time T, based on the time elapsed from the previous time $T_{prev}$ at which the tracking candidates in the tracking candidate information storage means 70 were obtained.

In detail, the position ($x_j$, $y_j$) and the speed ($u_j$, $v_j$) are calculated using the following Formulas 1 to 4, assuming uniform linear motion.

$$x_j \leftarrow x_j + u_j \times (T - T_{prev}) + e_x \qquad \text{(Formula 1)}.$$

$$y_j \leftarrow y_j + v_j \times (T - T_{prev}) + e_y \qquad \text{(Formula 2)}.$$

$$u_j \leftarrow u_j + e_u \qquad \text{(Formula 3)}.$$

$$v_j \leftarrow v_j + e_v \qquad \text{(Formula 4)}.$$

In Formulas 1 to 4, $e_x$, $e_y$, $e_u$, and $e_v$ are noise values added in view of the possibility that the motion of the object to be tracked deviates from uniform linear motion, and are each a value randomly generated for the candidate based on a normal distribution set by a predetermined variance.

The foregoing update formulas are typically used in PHD filters or particle filters. The tracking candidate state prediction means 21 may assume a motion model other than a uniform linear motion model, and predict the state of each tracking candidate using other update formulas typically used in PHD filters or particle filters.

Next, the sensor use weight update means 22 updates the information of each tracking candidate using the sensor information $Z_1$, ..., $Z_M$ obtained by the sensor information input means 10, as depicted in FIG. 4. In FIG. 4, each cross represents an observation value according to the sensor information.

First, the sensor use weight update means 22 additionally generates candidates in view of the possibility that there is any new object to be tracked (black circle in FIG. 4). In detail, the sensor use weight update means 22 newly generates, around each observation result, the preset number N of candidates per observation, and sets a weight $p_B$ for these candidates. Regarding the specific positions of the new candidates, for example, the new candidates may be uniformly dispersed around the observation result, or the new candidates may be randomly dispersed according to a normal distribution obtained by a predesignated variance about the observation result.

Which label (ID) of object to be tracked each of the newly added candidates corresponds to is undefined. Hence, the sensor use weight update means 22 assigns a value (e.g. 0) indicating the undefined state, as a label value.

In this case, the number of newly generated candidates is MN, and the total number of candidates is nN+MN. The weight $p_B$ of the MN newly generated candidates is a predetermined value from 0 to 1. The sensor use weight update means 22 sets a larger weight $p_B$ when the possibility of appearance of a new object to be tracked is higher. When there are many observation results, memory constraints could make it difficult to generate N new candidates per observation, i.e. a total of MN new candidates. In such a case, the sensor use weight update means 22 may set N' smaller than N, and generate N' new candidates per observation, i.e. a total of MN' new candidates. Here, the weight of each candidate may be set as $p_B \times N/N'$ instead of $p_B$.

The sensor use weight update means 22 then multiplies, by $p_s$, the weight of each of the nN candidates other than the newly generated candidates in view of the possibility that the object to be tracked has already disappeared. The value $p_s$ is a predetermined value from 0 to 1, and is set to be smaller when the possibility of disappearance is higher.

The sensor use weight update means 22 further updates the weight on the assumption that the tracking candidate nearer the sensor information is a more likely candidate. In detail, the sensor use weight update means 22 updates the weight of each candidate using the following Formula 5.

[Math. 1]

$$w_j \leftarrow (1 - p_D) \times w_j + \sum_{i=1}^{N} \tilde{\psi}_{ij} \times w_j \quad \text{(Formula 5)}$$

Where $$\tilde{\psi}_{ij} = \frac{p_D \psi_{ij}}{\kappa + \sum_j p_D \psi_{ij}} \quad \text{(Formula 6)}$$

In Formulas 5 and 6, $p_D$ denotes the probability (value from 0 to 1) of obtaining the detection result for the object to be tracked in the case where the object to be tracked exists, and $\kappa$ is a non-negative parameter indicating the possibility of the detection result being false.

Meanwhile, $\Psi_{ij}$ denotes the likelihood of observation as the observation result Zi in the case where the object to be tracked is Xj. For example, let the observation result be Zi=(x, y), simply assuming a normal distribution model. The likelihood $\Psi_{ij}$ is calculated using, for example, the following Formula 7.

[Math. 2]

$$\psi_{ij} = \frac{1}{2\pi\sigma^2} \exp(-\{(x - x_j)^2 + (y - y_j)^2\}/\sigma^2) \quad \text{(Formula 7)}$$

As shown in Formula 7, the object nearer the observation has a higher value of likelihood. Here, $\sigma$ is a standard deviation parameter of a predetermined normal distribution.

The likelihood calculated using Formula 6 is the likelihood corrected by also taking false detection into account. The first term on the right side of Formula 5 represents a weight change when assuming the case of undetection with no detection result being obtained, and the second term on the right side of Formula 5 represents a weight change when assuming that the detection result is obtained.

In the case where the detection result is not obtained, i.e. in the case where the detection result obtainment probability $p_D=0$, the above-mentioned process using Formula 5 is the process of setting the detection result $w_j \leftarrow w_j$ with no weight change on the ground that it is unaffected by the observation result. When $\kappa$ in the second term on the right side of Formula 5 is larger, the value of the second term on the right side is closer to 0 as the possibility of the observation result being false detection is higher, as a result of which the effect by the observation is ignored in the process using Formula 5.

As mentioned above, $p_D$ and $\kappa$ are parameters set in view of the possibility that the detection result is not necessarily accurate. The accuracy of the detection result can vary depending on the location. Accordingly, the sensor use weight update means 22 may use different values according to the location as the above-mentioned parameters, for example based on the assumption that more new objects are present near an entrance. The sensor use weight update means 22 may also perform time-based weight control, given that the possibility of appearance of a new object differs depending on the time. In the case where the number of new objects appearing is on the increase, the sensor use weight update means 22 may perform weight control assuming that more new objects are equally likely to appear in the future. Thus, the sensor use weight update means 22 may control the weight using other features.

The sensor information Z mentioned above may be sensor information by a plurality of asynchronously observing sensors of the same type or different types. In such a case, parameters different according to the sensor may be set to $p_D$ and $\kappa$. In the case of using a plurality of sensors, for example, there is a possibility that one location can be observed simultaneously by a plurality of sensors but another location can be observed only by a specific sensor. Accordingly, for each sensor, the detection result obtainment probability $p_D$ is set to 0 for any unobservable location.

In the case where an image is input, the sensor use weight update means 22 may additionally perform control to calculate the weight using the image. The sensor use weight update means 22 may use an image feature such as color. An example of such a feature is that the object to be tracked is red in color. In this case, for example, a term for correcting the likelihood of each candidate based on the similarity of the feature value may be added to the right side of Formula 5.

For example, the sensor use weight update means 22 may perform conversion using the image feature so that the weight w is higher when the similarity is higher, before performing the process using Formula 5. The feature of the object to be tracked may be a predetermined feature such as "red" as mentioned above, or may be a feature the corresponding detection result has when each ID is set.

The label use weight update means 30 includes candidate clustering means 31, label and cluster association means 32, and label use weight correction means 33.

Figure 5:
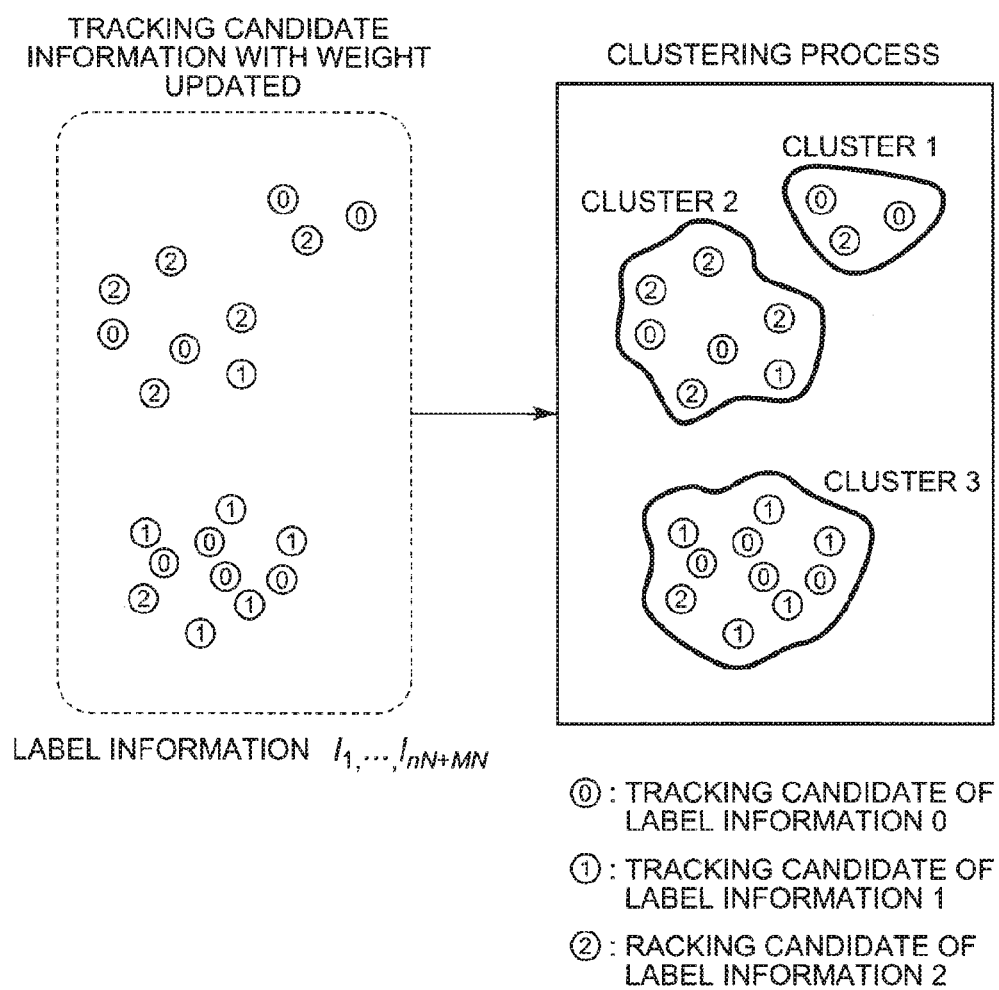
FIG. 5 is an explanatory diagram depicting an example of the process of clustering tracking candidates.

The candidate clustering means 31 generates clusters of candidates based on position information. FIG. 5 is an explanatory diagram depicting an example of the process of clustering tracking candidates. As depicted in FIG. 5, the candidate clustering means 31 clusters the candidates. Various clustering techniques are available. For example, the candidate clustering means 31 may generate clusters of candidates using a common clustering technique such as K-means. In the example depicted in FIG. 5, each circle represents a candidate, and the number in the circle represents the label information associated with the candidate. In the example depicted in FIG. 5, the candidate clustering means 31 classifies the candidates into three clusters.

When using K-means, the candidate clustering means 31 may perform clustering with the number of clusters being the integer obtained by rounding off the sum of candidate weights to the closest whole number. The candidate clustering means 31 may use a technique of performing clustering with an optimum number of clusters while estimating the number of clusters, such as X-means.

The candidate clustering means 31 may perform clustering using the likelihood calculated by the sensor use weight update means 22 according to Formula 6. In detail, the candidate clustering means 31 may regard, for each candidate Xj, the observation Zi for which the likelihood calculated using Formula 6 is highest as the observation to which the candidate belongs, and cluster the candidates for each observation.

In the case where the relationship of the following Formula 8 is met, the candidate clustering means 31 may determine that the candidate does not belong to any observation value, in view of the possibility of undetection.

[Math. 3]

$$\tilde{\psi}_{ij} < 1 - P_D \quad \text{(Formula 8)}$$

Even with such a clustering result that part of the candidates does not belong to any cluster, subsequent processing is unaffected. Besides, eliminating any unnecessary candidate from the processing stabilizes the processing.

The label and cluster association means 32 associates each cluster of the clustering result obtained by the candidate clustering means 31, with a label that is assumed to correspond to the cluster. In detail, the label and cluster association means 32 associates each generated cluster with label information, according to the weight (likelihood) of each candidate included in the cluster.

Figure 6:
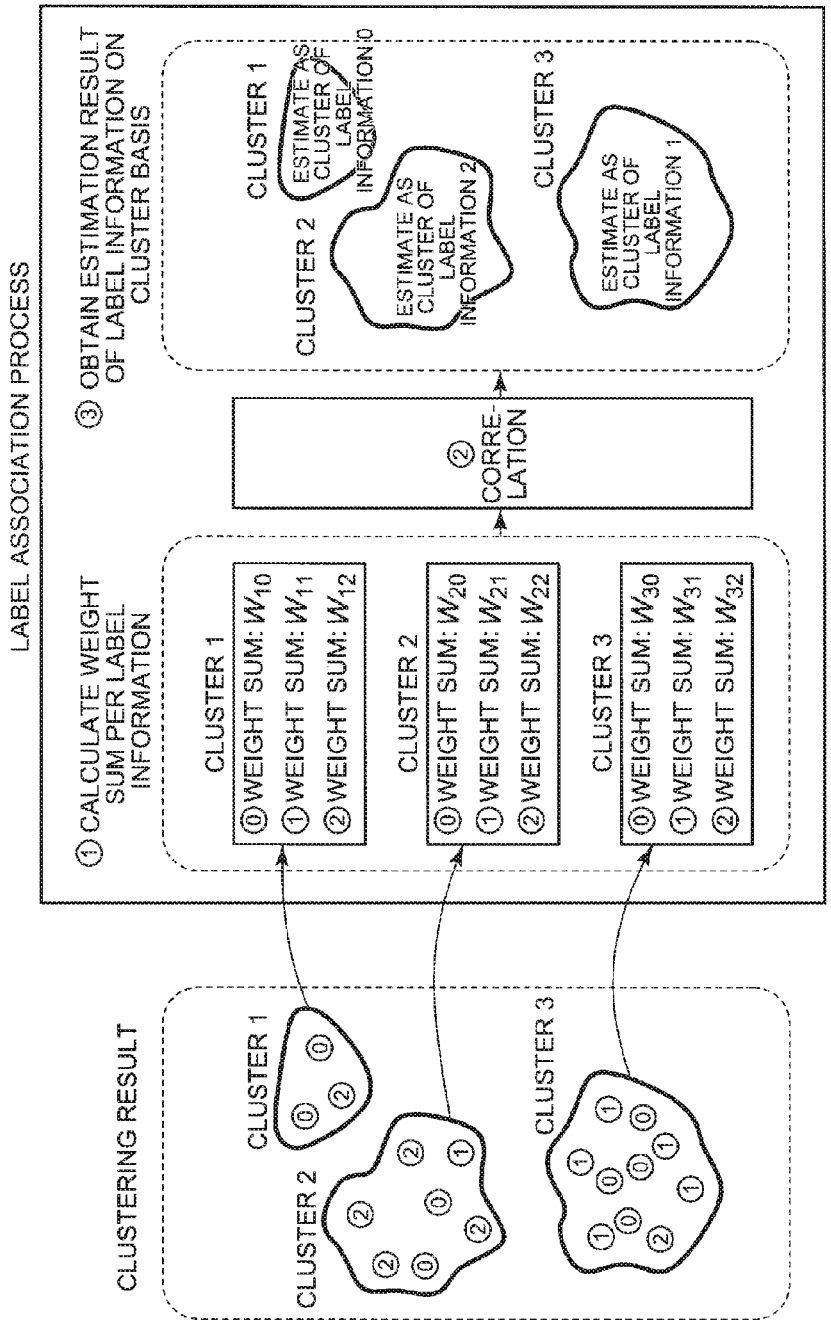
FIG. 6 is an explanatory diagram depicting an example of the process of associating each cluster with a label.

FIG. 6 is an explanatory diagram depicting an example of the process of associating each cluster with a label. As depicted in FIG. 6, the label and cluster association means 32 calculates, for each cluster, the weight sum per label information, determines the label of the largest weight sum as the label corresponding to the cluster, and associates the cluster with the label.

Regarding a cluster k, let $W_{k0}$ be the weight sum for a label 0, $W_{k1}$ be the weight sum for a label 1, and $W_{k2}$ be the weight sum for a label 2, as in the example depicted in FIG. 6. Then, the label and cluster association means 32 may determine the label 1 corresponding to the cluster k based on the following Formula 9.

$$l = \mathrm{argmax}(W_{kl'}) \quad \text{(Formula 9).}$$

Thus, the label and cluster association means 32 may associate the generated cluster with the label information for which the sum of likelihoods of candidates included in the cluster is largest. Alternatively, the label and cluster association means 32 may associate the generated cluster with the label information that is most frequent in the cluster.

For example, the cluster 1 depicted in FIG. 6 has two candidates of the label information 0 and one candidate of the label information 2, so that the weight sum $W_{10}$ is larger than the weight sum $W_{11}$ or $W_{12}$. The label and cluster association means 32 accordingly estimates the cluster 1 as the cluster of the label information 0, and associates the cluster 1 with the label information 0.

In such a method of selecting one label, there is a possibility that the same label is selected for different clusters. Hence, the label and cluster association means 32 may use an exclusive selection technique so as not to select the same label. A known example of the exclusive label selection method is the Hungarian method.

The label and cluster association means 32 does not need to limit the number of associated labels to 1. For example, the label and cluster association means 32 may select all labels that satisfy $W_{k1} > \alpha$ where $\alpha$ is a threshold. When a plurality of objects are near, the selected plurality of objects are hard to be distinguished. However, by associating the cluster with a plurality of candidate labels, the label and cluster association means 32 enables such tracking that partially has ambiguity, e.g. the cluster is not the cluster which the labels are unselected.

The threshold $\alpha$ may be preset, or dynamically set. In other words, the label and cluster association means 32 may use not a preset threshold but a threshold estimated dynamically from obtained results, as the threshold $\alpha$. An example is to arrange labels in descending order of weight sum, calculate the absolute difference between the weight sums of each pair of adjacent labels, and set, as the threshold $\alpha$, the average of the weight sums of the two adjacent labels corresponding to the largest absolute difference. Here, the label and cluster association means 32 may determine that no label is to be selected, if the largest absolute difference is less than a predesignated value.

The label and cluster association means 32 may select labels in descending order of weight sum, and stop the label selection when the sum of all weight sums of the selected labels is not less than a threshold. One or more labels can be selected by this method, too.

The label and cluster association means 32 may, after selecting labels, compare the minimum value of the weight sums of the selected labels and the maximum value of the weight sums of the unselected labels. In the case where the former value (the minimum value of the weight sums) is greater than the latter value (the maximum value of the weight sums) only by a predetermined threshold or less, the label and cluster association means 32 may determine that no label is to be selected on the ground that the selected labels are not sufficiently advantageous.

The label use weight correction means 33 corrects the weight of each candidate. In detail, the label use weight correction means 33 updates the likelihood of each candidate according to the label information of one or more other candidates around the candidate. In this exemplary embodiment, the label and cluster association means 32 has associated each cluster generated by clustering neighboring candidates, with label information. Accordingly, the label use weight correction means 33 uses the result of association by the label and cluster association means 32 to, from among the candidates in the same cluster, increase the weight of each candidate of the selected label, i.e. each candidate of the frequent label, and decrease the weight of each of the other candidates. In other words, the label use weight correction means 33 increases the weight (likelihood) of each candidate included in the cluster and corresponding to the associated label information. Updating the weight (likelihood) can be regarded as controlling the weight (likelihood) itself.

Since the label 0 indicates the state where no label is assigned, it may be excluded from the label and cluster association in the first place.

Figure 7:
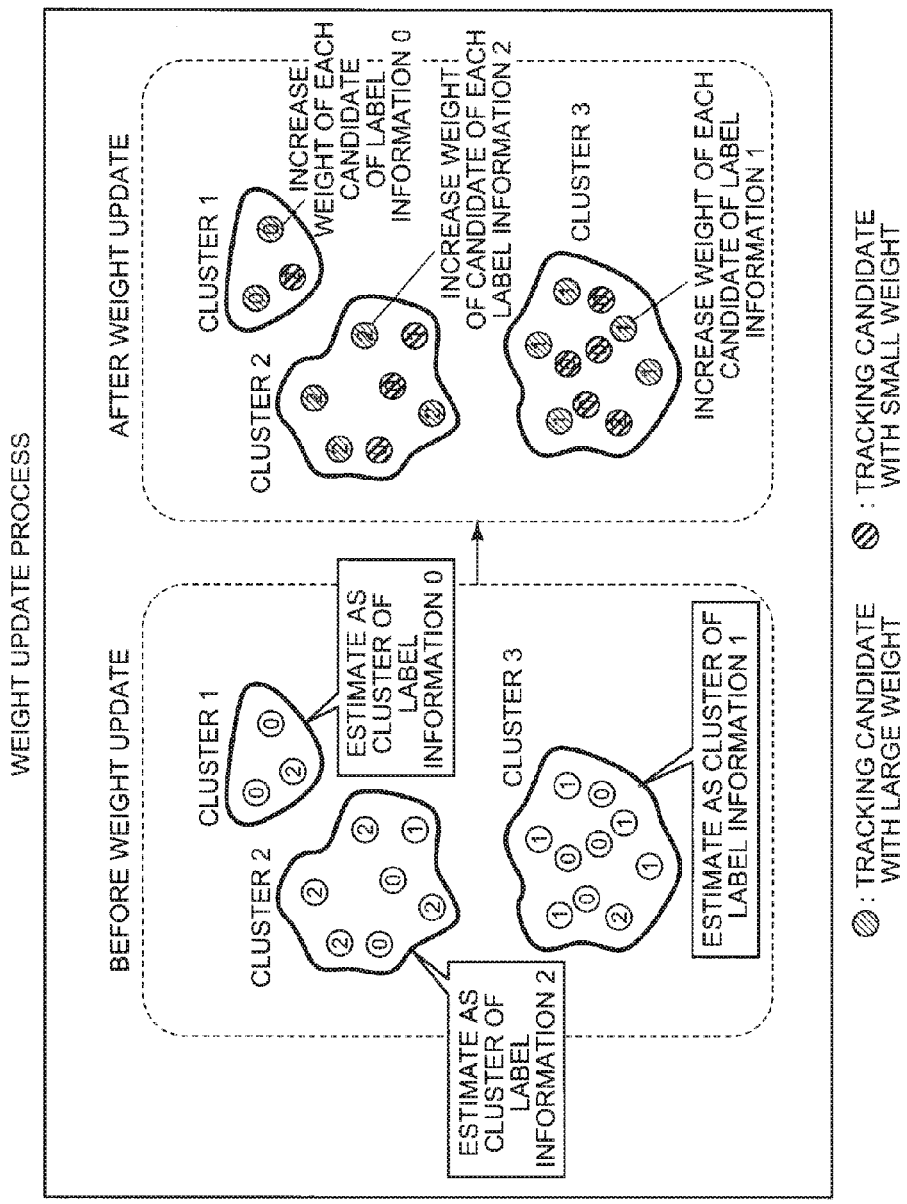
FIG. 7 is an explanatory diagram depicting an example of the process of updating the weight of each candidate.

FIG. 7 is an explanatory diagram depicting an example of the process of updating the weight (likelihood) of each candidate. For example, in the cluster 1 estimated as the cluster of the label information 0 in FIG. 7, the label use weight correction means 33 increases the weight of each candidate of the label information 0.

It is assumed that an object identified by an ID is more likely to exist when more information of the same label is present around it. The label use weight correction means 33 accordingly increases the weight of each candidate of such label information.

A specific example of the weight correction method by the label use weight correction means 33 is described below. First, the label use weight correction means 33 calculates the weight sum of candidates for each cluster. Next, the label use weight correction means 33 multiplies the weight of each candidate of the selected label (i.e. the label associated with the cluster) by β where β is a predetermined parameter not less than 1. The label use weight correction means 33 then multiplies the weights of the whole candidates by a constant so that the weight sum in the cluster is equal to the weight sum calculated earlier. In this way, the weights of the candidates of the associated label can be increased as a whole.

The weight correction method by the label use weight correction means 33 is not limited to the above-mentioned method. The label use weight correction means 33 may perform correction by adding a non-negative constant, instead of multiplying by β.

The weight correction described above is correction based on information that an object to be tracked is localized. In some cases, however, a plurality of label candidates are selected. In the case where there are a plurality of label candidates, the label use weight correction means 33 may skip the weight correction process on the ground that localization at any one object to be tracked cannot be determined.

As another constraint, the constraint that the weight sum of candidates of the same ID does not exceed 1 may be added. This is because the weight sum indicates the likelihood of existence of the object and one ID corresponds to one object, and so it is appropriate that the weight sum is at most 1.

Based on this constraint, the label use weight correction means 33 may perform control so that the sum of likelihoods of candidates corresponding to each label does not exceed 1. In detail, if the weight sum of candidates of the same ID is W which is a value greater than 1, the label use weight correction means 33 may multiply the weight of each candidate by 1/W so that the weight sum is 1.

As described above, the label use weight correction means 33 may perform, for each generated cluster, such control that increases the likelihood of each candidate corresponding to the label information for which the sum of likelihoods is not less than a threshold. Alternatively, the label use weight correction means 33 may perform, for each generated cluster, such control that increases the likelihood of each candidate corresponding to the most frequent label information.

Figure 8:
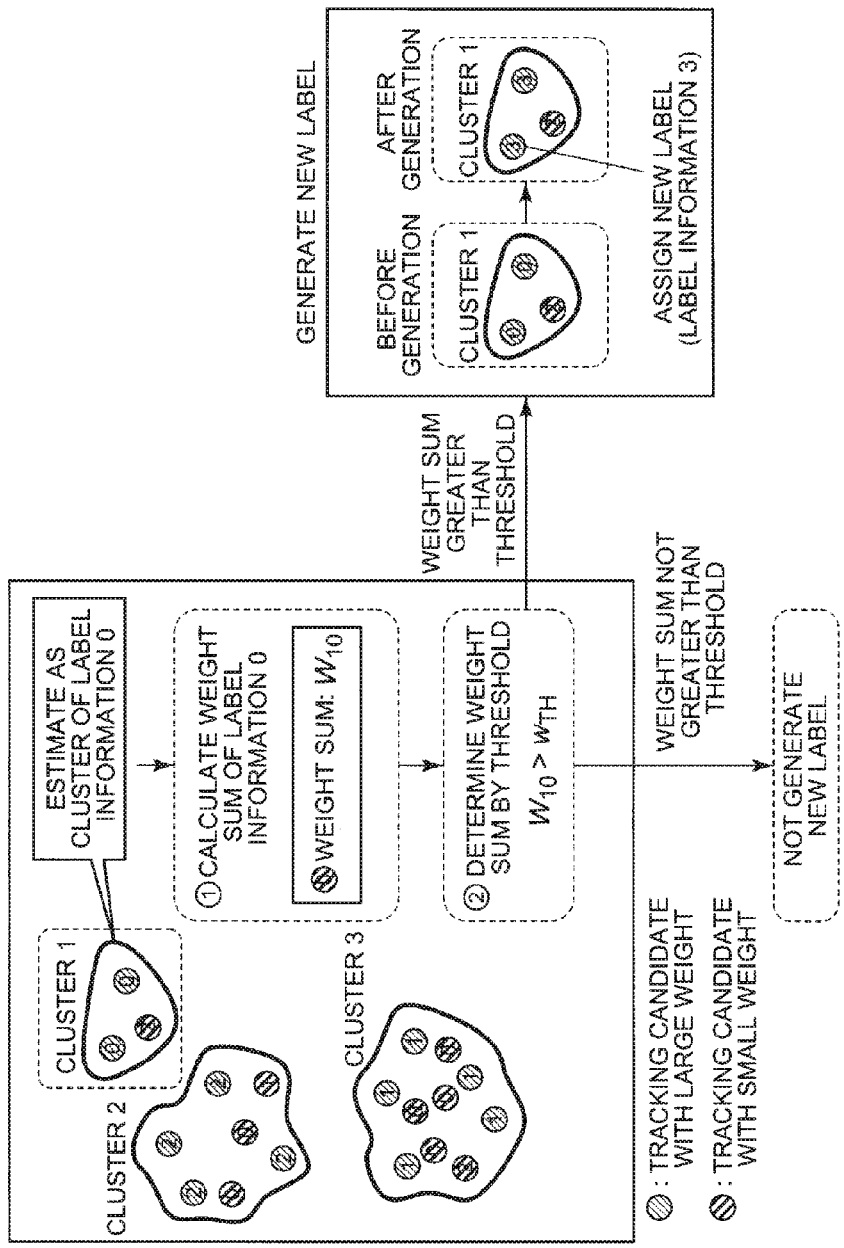
FIG. 8 is an explanatory diagram depicting an example of the process of generating a new label.

The new label generation means 40 generates, in the case where any new object to be tracked is present, a corresponding label. FIG. 8 is an explanatory diagram depicting an example of the process of generating a new label. The new label generation means 40 calculates, for each cluster k generated by the candidate clustering means 31, the weight sum $W_{k0}$ of the candidates of the label information 0 indicating the state that which object to be tracked corresponds to the candidate is unknown. If the weight sum $W_{k0}$ is greater than a predetermined threshold $\omega_{TH}$, the new label generation means 40 assigns a new label number to each candidate of the label information 0 in the cluster on the ground that the cluster represents a new object to be tracked.

For example, the cluster 1 depicted in FIG. 8 is estimated as the cluster of the label information 0. The new label generation means 40 calculates the weight sum $W_{10}$ of the label information 0. In the case where $W_{10}$ is greater than the threshold $\omega_{TH}$, the new label generation means 40 assigns a new label number (label information 3) to the cluster 1. In the case where $W_{10}$ is not greater than $\omega_{TH}$, the new label generation means 40 does not generate a new label.

Figure 9:
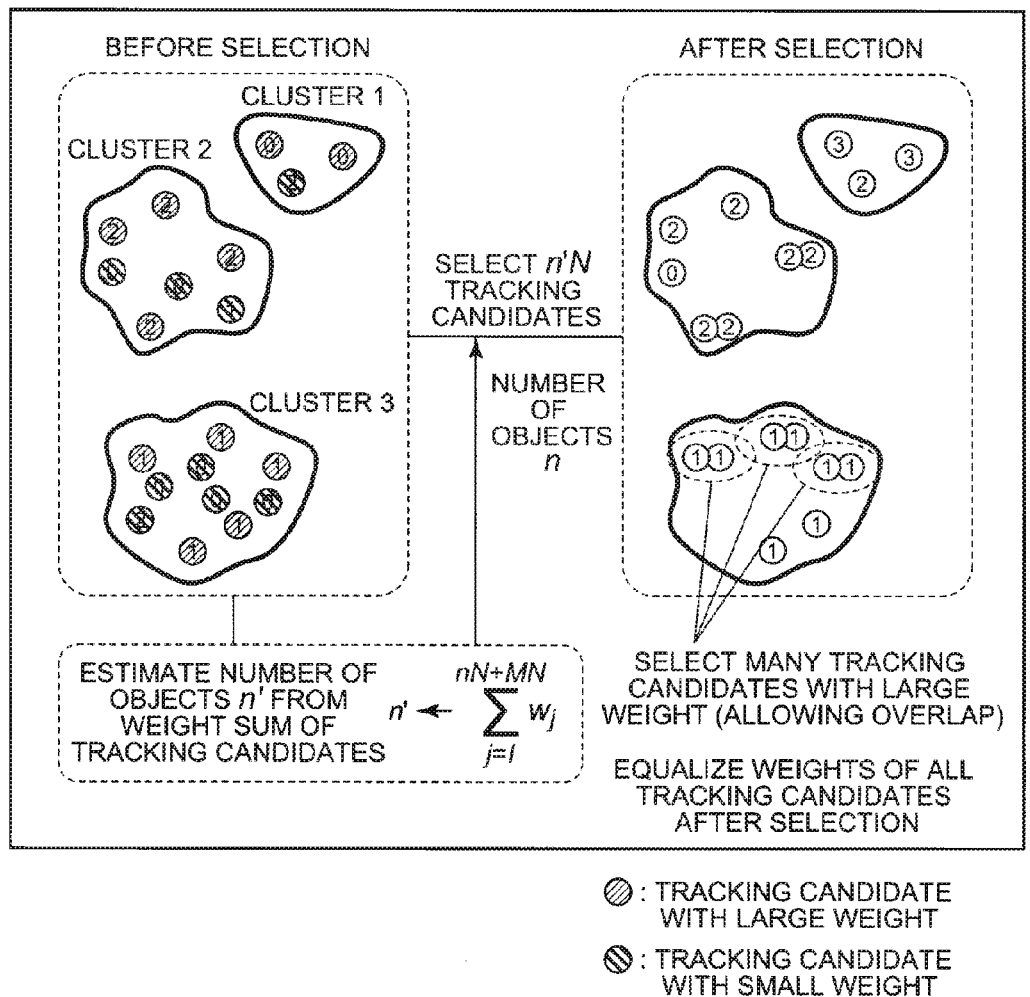
FIG. 9 is an explanatory diagram depicting an example of the process of selecting tracking candidates.

The tracking candidate selection means 50 reduces the tracking candidates to a certain number by leaving only the candidates with large weights, in order to reduce throughput. FIG. 9 is an explanatory diagram depicting an example of the process of selecting tracking candidates. In detail, as depicted in FIG. 9, the tracking candidate selection means 50 recalculates the expected number n' of objects to be tracked from the weight sum of the tracking candidates. For example, the tracking candidate selection means 50 may estimate the expected number n' of objects to be tracked using the following Formula 10.

[Math. 4]

$$n' \leftarrow \sum_{j=1}^{nN+MN} w_j \qquad \text{(Formula 10)}$$

In this case, the number of tracking candidates is calculated at n'N where N is the predetermined number of candidates per expected. The tracking candidate selection means 50 accordingly selects n'N candidates from the nN+MN candidates existing before the tracking candidate selection.

The tracking candidate selection means 50 randomly selects candidates according to the weight of each of the nN+MN tracking candidates. Here, if the overlapping selection of the same candidate is allowed, candidates with small weights are left unselected. Hence, for example in the case where the weight sum of candidates of a given ID is small, the ID disappears. Thus, this process automatically determines any ID that is less likely to exist as non-existent and deletes the ID. The tracking candidate selection means 50 stores the selected tracking candidates in the tracking candidate information storage means 70.

For example, in the cluster 3 depicted in FIG. 9, each of the three upper candidates of the label information 1 with large weights is overlappingly selected twice and each of the lower candidates of the label information 1 is selected once, while the candidates of the label information 0 and 2 are unselected and deleted.

After the n'N candidates are selected, the likelihood of each candidate is equal. The tracking candidate selection means 50 therefore modifies each weight to a uniform value 1/N so that the weight sum is n'N.

The object position output means 60 estimates the object position for each label (ID) and outputs the object position. In detail, the object position output means 60 may estimate the object position from the candidates corresponding to the label information, and display the estimated object position.

Figure 10:
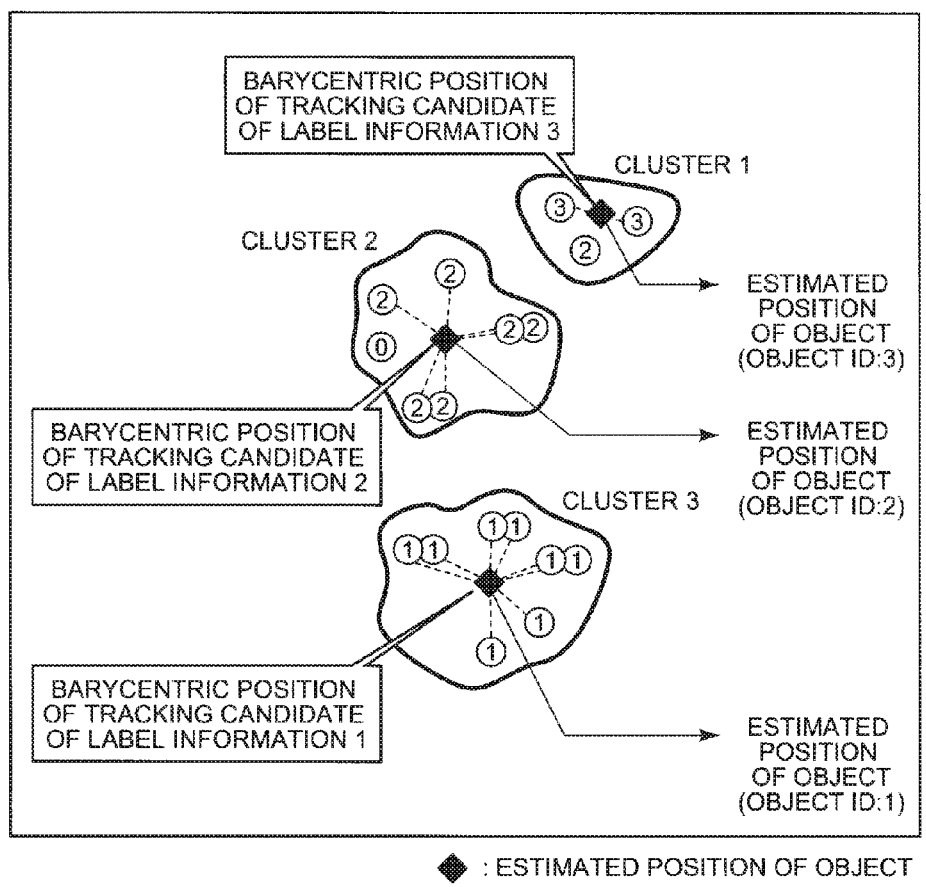
FIG. 10 is an explanatory diagram depicting an example of the process of outputting object positions.

FIG. 10 is an explanatory diagram depicting an example of the process of outputting object positions. As depicted in FIG. 10, the object position output means 60 may output, for each cluster generated by the candidate clustering means 31, the average position (barycentric position) of the candidates corresponding to the most frequent label as the object position corresponding to the label. Alternatively, regardless of the cluster, the object position output means 60 may simply calculate, for each label, the average (barycenter) of the candidates corresponding to the label, and output the calculated position as the object position.

In the case where candidates of the same label are present far from each other, the object position output means 60 may not output the object to be tracked at one position, but output the object to be tracked at a plurality of potential positions. Moreover, in the case where the weight sum of candidates corresponding to a label is not greater than a predetermined threshold, the object position output means 60 may not output the object to be tracked on the ground that its existence is unlikely.

The object position output means 60 may display not the object to be tracked itself but each candidate to indicate the object to be tracked. In detail, the object position output means 60 may display each candidate at the position indicated by the position information in the state corresponding to the label information, according to the likelihood of the candidate.

For example, the object position output means 60 may display, for each ID, all candidates together with the number (i.e. label) representing the ID. The object position output means 60 may also display all candidates with different colors being used for different IDs. In this case, many candidates are displayed for an ID whose likelihood of existence is high while not many candidates are displayed for an ID whose likelihood of existence is low, thus simultaneously realizing visualization of existence.

The object position output means 60 may, for example, display each candidate for which the corresponding label (ID) of object to be tracked is undefined (each candidate of the label information 0) in gray, and each candidate of the other label information in a color that differs depending on the label information.

In the case where N is very large, the number of candidates is very large, which makes it troublesome to display all candidates. In such a case, the object position output means 60 may vary the color density according to the number of candidates per unit area, and collectively display the candidates per unit area like a cloud.

The object position output means 60 may display the observation results with IDs, instead of displaying the candidates for the objects. In detail, the object position output means 60 calculates, for each candidate, which observation value the candidate is near, and associates the candidate and the observation value. Here, the object position output means 60 may, for each observation value, output the observation value in association with the ID in the case where the ID with the largest weight sum from among the candidates associated with the observation value is other than 0 (i.e. the information label 0), and not output the ID in the case where the ID is 0.

The object position output means 60 may not necessarily assign the ID to only the candidates with the largest weight sum and display them. For example, in the case where there are a plurality of IDs for which the weight sum is not less than a threshold, the object position output means 60 may display the plurality of IDs on the ground that the object to be tracked cannot be reliably determined from among these IDs, or display information that the object to be tracked cannot be determined.

The object position output means 60 may simultaneously display the value of the expected number n' of objects, when outputting the object positions. The object position output means 60 may display the weight sum of the candidates whose labels are other than 0 as the number of objects, instead of n'. The use of the weight sum enables display of the number of objects estimated to exist more reliably, because it represents the number of candidates actually assigned to the objects to be tracked.

To output a more reliable value (the number of objects to be tracked), the object position output means 60 may, for the candidates whose labels are not less than 1 (i.e. whose labels are other than the label indicating the undefined state), integrate and output the weights of only the labels for each of which the weight sum is not less than the threshold.

The object position output means 60 may assume the maximum and minimum values calculated by the above-mentioned plurality of methods as a reliable range of the estimated number of objects, and output the plurality of values in the range. Given that the displayed number of objects is an estimate, the object position output means 60 may display the sum per se in the form of including the value after the decimal point, to demonstrate its ambiguity. Alternatively, the object position output means 60 may display the integer obtained by rounding off to the closest whole number, to demonstrate that the calculated value is the number of objects.

The process by the object position output means 60 is performed after updating the tracking candidate information, and is merely a process of estimating one result at the time. Therefore, the output of the estimation result does not affect the subsequent input observation values or tracking results.

In this exemplary embodiment, the updated tracking candidate information is stored in the tracking candidate information storage means 70, and used again by the tracking candidate weight update means 20 when the next observation information is received. Hence, even if the object position output means 60 outputs an erroneous result at one point, likelihoods are updated repeatedly and so a correct result can be output by subsequent processing.

The sensor information input means 10, the tracking candidate weight update means 20 (more specifically, the tracking candidate state prediction means 21 and the sensor use weight update means 22), the label use weight update means 30 (more specifically, the candidate clustering means 31, the label and cluster association means 32, and the label use weight correction means 33), the new label generation means 40, the tracking candidate selection means 50, and the object position output means 60 are realized by a CPU of a computer operating according to a program (object racking program).

For example, the program may be stored in a storage unit (not depicted) in the object tracking device, with the CPU reading the program and, according to the program, operating as the sensor information input means 10, the tracking candidate weight update means 20 (more specifically, the tracking candidate state prediction means 21 and the sensor use weight update means 22), the label use weight update means 30 (more specifically, the candidate clustering means 31, the label and cluster association means 32, and the label use weight correction means 33), the new label generation means 40, the tracking candidate selection means 50, and the object position output means 60.

Alternatively, the sensor information input means 10, the tracking candidate weight update means 20 (more specifically, the tracking candidate state prediction means 21 and the sensor use weight update means 22), the label use weight update means 30 (more specifically, the candidate clustering means 31, the label and cluster association means 32, and the label use weight correction means 33), the new label generation means 40, the tracking candidate selection means 50, and the object position output means 60 may each be realized by dedicated hardware.

The tracking candidate information storage means 70 is realized by, for example, a magnetic disk device included in the object tracking device.

Figure 11:
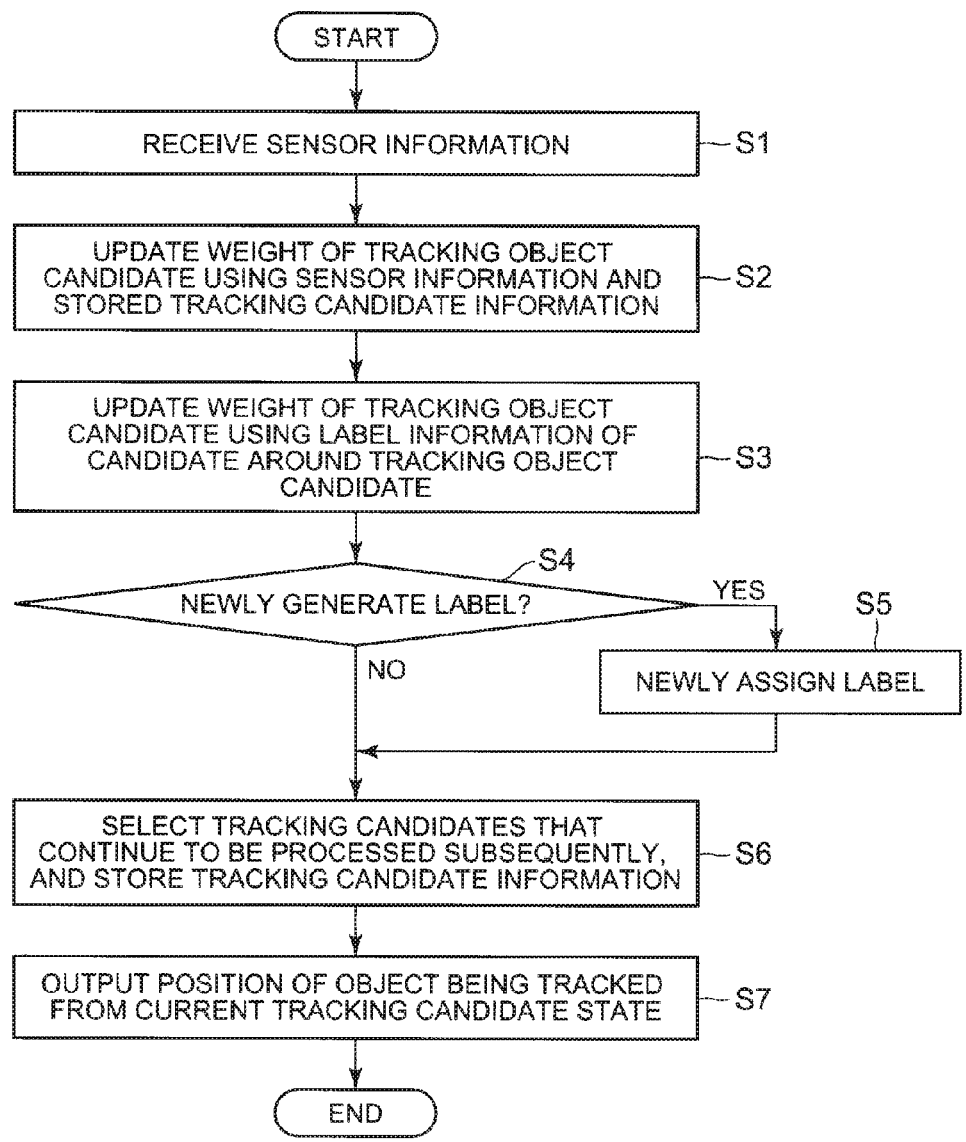
FIG. 11 is a flowchart depicting an example of the operation of the object tracking device in the exemplary embodiment.

The following describes the operation in this exemplary embodiment. FIG. 11 is a flowchart depicting an example of the operation of the object tracking device in this exemplary embodiment. In the example depicted in FIG. 11, first, the sensor information input means 10 receives sensor information (step S1).

Following this, the tracking candidate weight update means 20 updates the weight of each tracking candidate (step S2). In detail, the sensor use weight update means 22 updates the weight of each tracking object candidate using the sensor information and the stored tracking candidate information.

Figure 12:
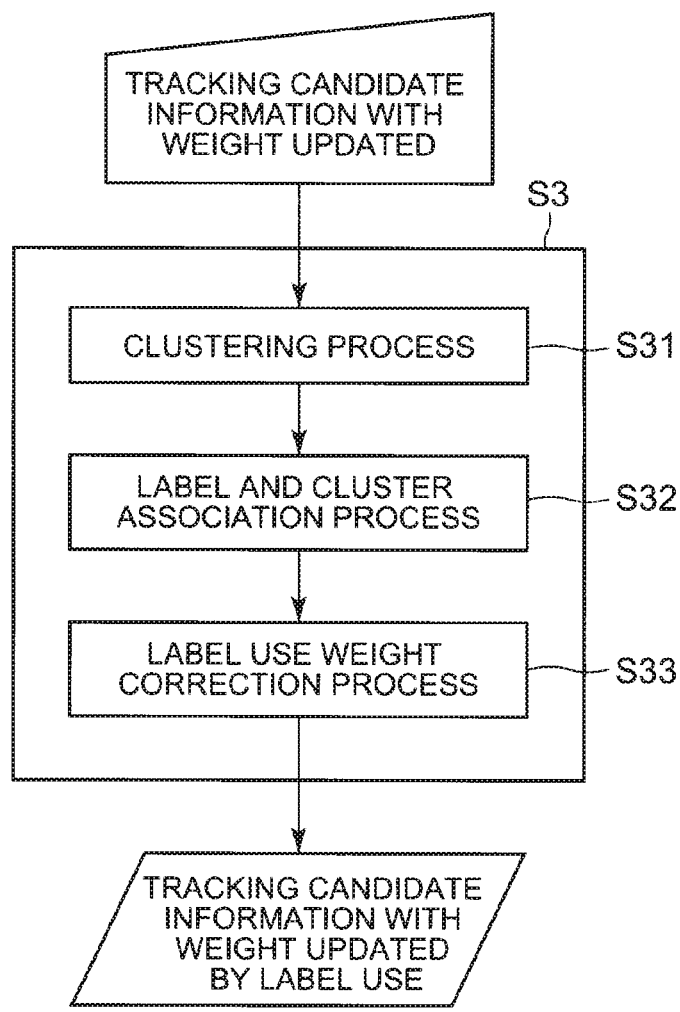
FIG. 12 is a flowchart depicting an example of the process of updating the weight of each candidate.

Next, the label use weight update means 30 updates the weight of each tracking object candidate using the label information of each candidate around the tracking object candidate (step S3). FIG. 12 is a flowchart depicting an example of the process of updating the weight of each candidate by the label use weight update means 30.

In detail, as depicted in FIG. 12, the candidate clustering means 31 performs the clustering process (step S31 in FIG. 12). The process depicted in FIG. 5 is an example of the process in step S31. Next, the label and cluster association means 32 associates labels and clusters (step S32). The process depicted in FIG. 6 is an example of the process in step S32. Next, the label use weight correction means 33 corrects each weight (step S33). The process depicted in FIG. 7 is an example of the process in step S33.

After this, the new label generation means 40 determines whether or not to newly generate a label (step S4 in FIG. 11). In the case of determining to newly generate a label (step S4: YES), the new label generation means 40 newly assigns a label (step S5). In the case of determining not to newly generate a label (step S4: NO), the new label generation means 40 does not newly assign a label. The process depicted in FIG. 8 is an example of the process in steps S4 and S5.

Next, the tracking candidate selection means 50 selects tracking candidates that continue to be processed subsequently, and stores the tracking candidate information in the tracking candidate information storage means 70 (step S6). The process depicted in FIG. 9 is an example of the process in step S6.

The object position output means 60 then outputs the position of each object being tracked, from the current tracking candidate state (step S7). The process depicted in FIG. 10 is an example of the process in step S7.

As described above, according to this exemplary embodiment, a plurality of candidates are held for objects to be tracked by the object tracking device, and each of the plurality of candidates is associated with label information identifying which object the candidate corresponds to, position information indicating the position of the object, and a likelihood. The label use weight update means 30 (more specifically, the label use weight correction means 33) controls the likelihood of a candidate, according to the label information of other candidates around the candidate determined based on the position information of the candidate. The label use weight update means 30 (more specifically, the label use weight correction means 33) equally controls the likelihood of a candidate selected from the other candidates, according to the label information of candidates around the candidate.

The object tracking device in this exemplary embodiment tracks a plurality of objects that appear or disappear with time, using many candidates such as particle filtering. In this exemplary embodiment, a label is held for each candidate to indicate which object the candidate corresponds to, and the weight of the candidate is controlled according to the labels of the surrounding candidates. For example, the likelihood is corrected to be higher when many candidates of the same label are present nearby while referencing the labels of neighboring candidates, based on the knowledge that the object to be tracked is localized.

Therefore, even in the case where objects to be tracked are near each other, the likelihood (weight) of each candidate can be appropriately controlled, with it being possible to properly track each object.

Figure 13:
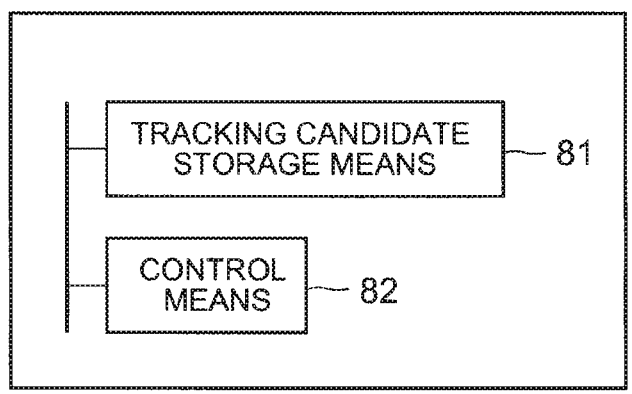
FIG. 13 is a block diagram schematically depicting an object tracking device according to the present invention.

The following describes an overview of the present invention. FIG. 13 is a block diagram schematically depicting an object tracking device according to the present invention. The object tracking device according to the present invention is an object tracking device for tracking one or more objects, and includes: a tracking candidate storage means 81 (e.g. the tracking candidate information storage means 70) which stores a plurality of candidates for the objects to be tracked; and a control means 82 (e.g. the label use weight correction means 33) which controls (e.g. updating) a likelihood (e.g. weight) of each of the plurality of candidates. The objects to be tracked according to the present invention are not limited to things such as vehicles, and may include humans.

The tracking candidate storage means 81 stores, for each of the plurality of candidates, label information (e.g. label, ID) identifying which object the candidate corresponds to, position information indicating a position of the object, and a likelihood.

The control means 82 controls the likelihood of a candidate, according to the label information of one or more other candidates around the candidate determined based on the position information of the candidate.

With this structure, each object can be properly tracked even in the case where objects to be tracked are near each other in an environment in which the number of objects changes with time.

The object tracking device may include a candidate clustering means (e.g. the candidate clustering means 31) which generates one or more clusters of the plurality of candidates based on the position information. The control means 82 may perform, for each of the generated clusters, control to increase the likelihood of each candidate corresponding to label information for which a sum of likelihoods is not less than a threshold.

With this structure, in the case where a plurality of candidates with high likelihoods are present nearby, the likelihood for the object to be tracked can be increased. As a result, each object can be tracked properly. While there is a possibility that the sum of likelihoods is not less than the threshold for each of a plurality of pieces of label information, this structure allows for selecting a plurality of pieces of label information. Hence, in the case where objects to be tracked pass each other, the label information of the candidates can be kept from being summarized into single label information, and so tracking result fragmentation can be suppressed.

Alternatively, the control means 82 may perform, for each of the generated clusters, control to increase the likelihood of each candidate corresponding to most frequent label information. With this structure, even in the case where the likelihood is low as a whole, the complete loss of objects to be tracked can be prevented.

The object tracking device may include a label information association means (e.g. the label and cluster association means 32) which associates each of the generated clusters with label information, according to the likelihood of each candidate included in the cluster. The control means 82 may perform control to increase the likelihood of each candidate included in the cluster and corresponding to the associated label information. By using the clustered candidates in this way, each object can be tracked more appropriately.

The label information association means may select, as the label information associated with the cluster, label information not associated with any other cluster. With this structure, it is possible to prevent determining one object to be tracked as a plurality of objects.

After selecting the label information associated with the cluster, the label information association means may cancel the association of the selected label information in the case where a difference between a sum of likelihoods of candidates corresponding to the selected label information and a sum of likelihoods of candidates corresponding to unselected label information is not greater than a threshold. Assigning label information of low likelihood can be prevented in this way.

The control means 82 may perform control so that, for each label, a sum of likelihoods of candidates corresponding to the label does not exceed 1. The weight sum indicates the likelihood of existence of the object and one piece of label information corresponds to one object, and so it is appropriate that the weight sum is at most 1.

The object tracking device may include a display means which displays each candidate at the position indicated by the position information in a state (e.g. changing the color, displaying the ID, changing the color density according to the number of candidates per unit area, etc.) corresponding to the label information, according to the likelihood of the candidate. This structure facilitates visual recognition of the position of each candidate for each object to be tracked which is identified by label information.

The foregoing exemplary embodiment may be partly or wholly described in the following supplementary notes, though the present invention is not limited to such.

(Supplementary note 1) An object tracking device for tracking one or more objects, the object tracking device including: a tracking candidate storage means which stores a plurality of candidates for the objects to be tracked; and a control means which controls a likelihood of each of the plurality of candidates, wherein the tracking candidate storage means stores, for each of the plurality of candidates, label information identifying which object the candidate corresponds to, position information indicating a position of the object, and a likelihood, and wherein the control means controls the likelihood of a candidate, according to the label information of one or more other candidates around the candidate determined based on the position information of the candidate.

(Supplementary note 2) The object tracking device according to supplementary note 1, including a candidate clustering means which generates one or more clusters of the plurality of candidates based on the position information, wherein the control means performs, for each of the generated clusters, control to increase the likelihood of each candidate corresponding to label information for which a sum of likelihoods is not less than a threshold.

(Supplementary note 3) The object tracking device according to supplementary note 1, including a candidate clustering means which generates one or more clusters of the plurality of candidates based on the position information, wherein the control means performs, for each of the generated clusters, control to increase the likelihood of each candidate corresponding to most frequent label information.

(Supplementary note 4) The object tracking device according to supplementary note 2 or 3, including a label information association means which associates each of the generated clusters with label information, according to the likelihood of each candidate included in the cluster, wherein the control means performs control to increase the likelihood of each candidate included in the cluster and corresponding to the associated label information.

(Supplementary note 5) The object tracking device according to supplementary note 4, wherein the label information association means selects, as the label information associated with the cluster, label information not associated with any other cluster.

(Supplementary note 6) The object tracking device according to supplementary note 4 or 5, wherein after selecting the label information associated with the cluster, the label information association means cancels the association of the selected label information in the case where a difference between a sum of likelihoods of candidates corresponding to the selected label information and a sum of likelihoods of candidates corresponding to unselected label information is not greater than a threshold.

(Supplementary note 7) The object tracking device according to any one of supplementary notes 1 to 6, wherein the control means performs control so that, for each label, a sum of likelihoods of candidates corresponding to the label does not exceed 1.

(Supplementary note 8) The object tracking device according to any one of supplementary notes 1 to 7, including a display means which displays each candidate at the position indicated by the position information in a state corresponding to the label information, according to the likelihood of the candidate.

(Supplementary note 9) An object tracking method for tracking one or more objects, the object tracking method including: holding a plurality of candidates for the objects to be tracked, each of the plurality of candidates being associated with label information identifying which object the candidate corresponds to, position information indicating a position of the object, and a likelihood; and controlling the likelihood of a candidate, according to the label information of one or more other candidates around the candidate determined based on the position information of the candidate.

(Supplementary note 10) The object tracking method according to supplementary note 9, including: generating one or more clusters of the plurality of candidates based on the position information; and performing, for each of the generated clusters, control to increase the likelihood of each candidate corresponding to label information for which a sum of likelihoods is not less than a threshold.

(Supplementary note 11) The object tracking method according to supplementary note 9, including: generating one or more clusters of the plurality of candidates based on the position information; and performing, for each of the generated clusters, control to increase the likelihood of each candidate corresponding to most frequent label information.

(Supplementary note 12) The object tracking method according to supplementary note 10 or 11, including: associating each of the generated clusters with label information, according to the likelihood of each candidate included in the cluster; and performing control to increase the likelihood of each candidate included in the cluster and corresponding to the associated label information.

(Supplementary note 13) The object tracking method according to supplementary note 12, including selecting, as the label information associated with the cluster, label information not associated with any other cluster.

(Supplementary note 14) The object tracking method according to supplementary note 12 or 13, including, after selecting the label information associated with the cluster, canceling the association of the selected label information in the case where a difference between a sum of likelihoods of candidates corresponding to the selected label information and a sum of likelihoods of candidates corresponding to unselected label information is not greater than a threshold.

(Supplementary note 15) The object tracking method according to any one of supplementary notes 9 to 14, including performing control so that, for each label, a sum of likelihoods of candidates corresponding to the label does not exceed 1.

(Supplementary note 16) The object tracking method according to any one of supplementary notes 9 to 15, including displaying each candidate at the position indicated by the position information in a state corresponding to the label information, according to the likelihood of the candidate.

(Supplementary note 17) An object tracking program used in a computer for tracking one or more objects, the computer holding a plurality of candidates for the objects to be tracked, the object tracking program causing the computer to: execute a control process of controlling a likelihood of each of the plurality of candidates, each of the plurality of candidates being associated with label information identifying which object the candidate corresponds to, position information indicating a position of the object, and a likelihood; and in the control process, control the likelihood of a candidate, according to the label information of one or more other candidates around the candidate determined based on the position information of the candidate.

(Supplementary note 18) The object tracking program according to supplementary note 17, causing the computer to: execute a candidate clustering process of generating one or more clusters of the plurality of candidates based on the position information; and in the control process, perform, for each of the generated clusters, control to increase the likelihood of each candidate corresponding to label information for which a sum of likelihoods is not less than a threshold.

(Supplementary note 19) The object tracking program according to supplementary note 17, causing the computer to: execute a candidate clustering process of generating one or more clusters of the plurality of candidates based on the position information; and in the control process, perform, for each of the generated clusters, control to increase the likelihood of each candidate corresponding to most frequent label information.

(Supplementary note 20) The object tracking program according to supplementary note 18 or 19, causing the computer to: execute a label information association process of associating each of the generated clusters with label information, according to the likelihood of each candidate included in the cluster; and in the control process, perform control to increase the likelihood of each candidate included in the cluster and corresponding to the associated label information.

(Supplementary note 21) The object tracking program according to supplementary note 20, causing the computer to, in the label information association process, select, as the label information associated with the cluster, label information not associated with any other cluster.

(Supplementary note 22) The object tracking program according to supplementary note 20 or 21, causing the computer to, in the label information association process, after selecting the label information associated with the cluster, cancel the association of the selected label information in the case where a difference between a sum of likelihoods of candidates corresponding to the selected label information and a sum of likelihoods of candidates corresponding to unselected label information is not greater than a threshold.

(Supplementary note 23) The object tracking program according to any one of supplementary notes 17 to 22, causing the computer to, in the control process, perform control so that, for each label, a sum of likelihoods of candidates corresponding to the label does not exceed 1.

(Supplementary note 24) The object tracking program according to any one of supplementary notes 17 to 23, causing the computer to execute a display process of displaying each candidate at the position indicated by the position information in a state corresponding to the label information, according to the likelihood of the candidate.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

This application claims priority based on Japanese Patent Application No. 2013-148390 filed on Jul. 17, 2013, the disclosure of which is incorporated herein in its entirety.

REFERENCE SIGNS LIST 10 sensor information input means
20 tracking candidate weight update means
21 tracking candidate state prediction means
22 sensor use weight update means
30 label use weight update means
31 candidate clustering means
32 label and cluster association means
33 label use weight correction means
40 new label generation means
50 tracking candidate selection means
60 object position output means
70 tracking candidate information storage means
71, 72 tracking candidate information

The invention claimed is:
1. An object tracking device for tracking a plurality of objects, the object tracking device comprising:
  a memory storing a set of instructions; and
  at least one processor configured to execute the instructions to:
    store a plurality of candidates for objects to be tracked, each candidate being associated with label information identifying which object the candidate corresponds to, position information, and a likelihood;
    determine, based on position information of one of the plurality of candidates, one or more other candidates around the candidate; and
    update a likelihood of the candidate, according to the label information of the determined one or more other candidates around the candidate.
2. The object tracking device according to claim 1, wherein the at least one processor is further configured to execute the instructions to:
  generate one or more clusters of the plurality of candidates based on the position information; and
  control to increase, for each of the generated clusters, the likelihood of each candidate corresponding to label information for which a sum of likelihoods is not less than a threshold.

3. The object tracking device according to claim 1, wherein the at least one processor is further configured to execute the instructions to:
generate one or more clusters of the plurality of candidates based on the position information; and
control to increase, for each of the generated clusters, the likelihood of each candidate corresponding to most frequent label information.

4. The object tracking device according to claim 2, wherein the at least one processor is further configured to execute the instructions to:
associate each of the generated clusters with label information, according to likelihood of each candidate included in the cluster; and
control to increase the likelihood of each candidate included in the cluster corresponding to the associated label information.

5. The object tracking device according to claim 4, wherein the at least one processor is further configured to execute the instructions to:
select, as the label information associated with the cluster, label information not associated with any other cluster.

6. The object tracking device according to claim 4, wherein the at least one processor is further configured to execute the instructions to:
cancel, after selecting the label information associated with the cluster, the association of the selected label information where a difference between a sum of likelihoods of candidates corresponding to the selected label information and a sum of likelihoods of candidates corresponding to unselected label information is not greater than a threshold.

7. The object tracking device according to claim 1, wherein the at least one processor is further configured to execute the instructions to:
perform control so that, for each label, a sum of likelihoods of candidates corresponding to the label information does not exceed 1.

8. The object tracking device according to claim 1, wherein the at least one processor is further configured to execute the instructions to:
display, each candidate at a position indicated by the position information in a state corresponding to the label information, according to the likelihood of the candidate.

9. An object tracking method for tracking a plurality of objects, the object tracking method comprising:
holding a plurality of candidates for objects to be tracked, each of the plurality of candidates being associated with label information identifying which object the candidate corresponds to, position information, and a likelihood;
determining, based on position information of one of the plurality of candidates, one or more other candidates around the candidate; and
updating a likelihood of the candidate, according to the label information of the determined one or more other candidates around the candidate.

10. The object tracking method according to claim 9, further comprising:
generating one or more clusters of the plurality of candidates based on the position information; and
performing, for each of the generated clusters, control to increase the likelihood of each candidate corresponding to label information for which a sum of likelihoods is not less than a threshold.

11. A non-transitory computer readable information recording medium storing an object tracking program which when executed, causes a processor to perform a method for tracking a plurality of objects, the method comprising:
storing a plurality of candidates for objects to be tracked, each of the plurality of candidates being associated with label information identifying which object the candidate corresponds to, position information, and a likelihood;
determining, based on position information of one of the plurality of candidates, one or more other candidates around the candidate; and
updating a likelihood of the candidate, according to the label information of the determined one or more other candidates around the candidate.

12. The non-transitory computer readable information recording medium according to claim 11, wherein the method further comprising:
generating one or more clusters of the plurality of candidates based on the position information; and
performing, for each of the generated clusters, control to increase the likelihood of each candidate corresponding to label information for which a sum of likelihoods is not less than a threshold.

* * * * *